United States Patent [19]
Wilson et al.

[11] Patent Number: 5,901,800
[45] Date of Patent: May 11, 1999

[54] HIGH CLEARANCE TRACTOR

[76] Inventors: William Andrew Wilson, 815 Woodland Ave.; Gary Edward Richter, 11990 County Rd. 96, both of Woodland, Calif. 95695

[21] Appl. No.: 08/696,257

[22] Filed: Aug. 13, 1996

[51] Int. Cl.$^6$ ................................................. B62D 55/084
[52] U.S. Cl. ...................... 180/9.48; 180/327; 180/298; 180/89.13; 180/906; 280/755
[58] Field of Search .................. 180/9.48, 9.23, 180/6.3, 326, 327, 328, 89.12, 89.13, 89.15, 298, 906, 89.17; 280/755, 757, 758, 638

[56] References Cited

U.S. PATENT DOCUMENTS

| | | | |
|---|---|---|---|
| 3,205,961 | 9/1965 | Nolte | 180/9.48 |
| 3,494,439 | 2/1970 | Kline | 180/9.48 X |
| 3,712,398 | 1/1973 | Althaus | 180/9.48 |
| 3,820,616 | 6/1974 | Juergens | 180/9.48 |
| 3,841,429 | 10/1974 | Falcone et al. | 180/327 |
| 3,894,598 | 7/1975 | Yeou | 180/9.48 |
| 4,431,074 | 2/1984 | Langerud | 180/9.48 |
| 5,293,949 | 3/1994 | Zimmermann | 180/9.48 |
| 5,598,896 | 2/1997 | Haest | 180/9.48 |
| 5,638,908 | 6/1997 | Masumoto et al. | 180/9.48 X |

FOREIGN PATENT DOCUMENTS

| | | | |
|---|---|---|---|
| 528051 | 9/1976 | U.S.S.R. | 180/89.13 |
| 986180 | 3/1965 | United Kingdom | 180/9.48 |
| 1048722 | 11/1966 | United Kingdom | 180/9.48 |

*Primary Examiner*—Kevin Hurley
*Attorney, Agent, or Firm*—William S. Bernheim Esq.

[57] ABSTRACT

An agricultural tractor having a central structure which includes a rotatable cab and a platform on which an engine is slideably mounted and the location of which is hydraulically controlled.

2 Claims, 3 Drawing Sheets

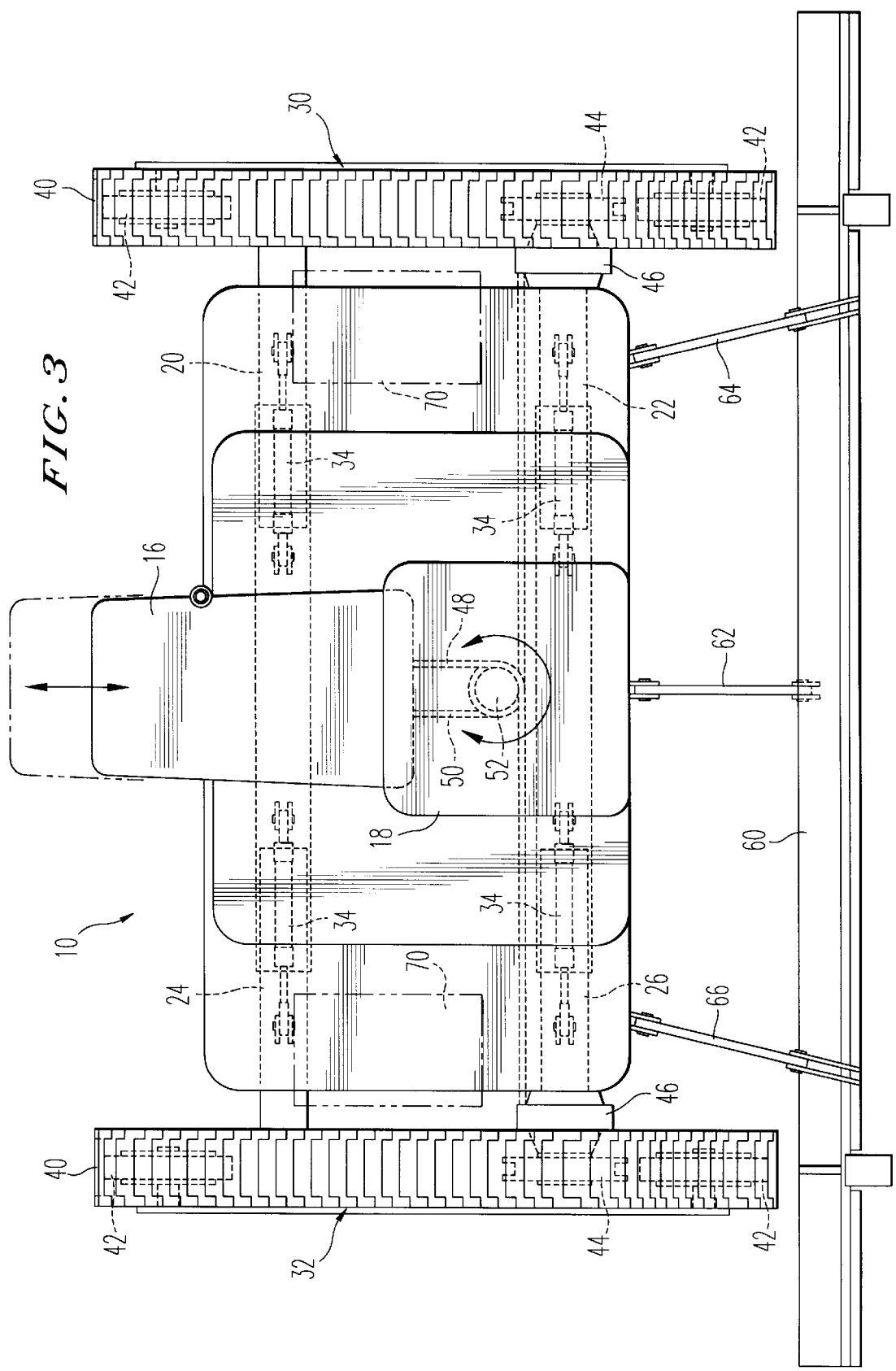

HIGH CLEARANCE TRACTOR

BACKGROUND OF THE INVENTION

1. Field of the Invention

This invention relates to an agricultural tractor having high vertical clearance.

2. Description of the Prior Art

Agriculture has a tremendous need for tractors having various characteristics. This need has been met primarily by building a wide variety of tractors, including wheeled and tracked, of various heights and configurations. For example, wheel tractors are typically cheaper to run and faster, but cause increased soil compaction. Tracked tractors have better traction and soil compactiion characteristics, but the width of the tractor base cannot be modified.

Tractors typically need to run through fields discing, harrowing, spraying, weeding, cultivating and maintaining the contours of the rows and furrows. To allow field access many crops are planted in rows between furrows. The wheels or tracks pass down the furrows. The passage down the furrow causes compaction of the soil which interferes with irrigation and root propagation. The height of the plants and vertical clearance of the tractor determines the point at which the tractor can no longer enter the field until harvest. Frequently, furrow spacing becomes a function of the tractors rather than what is best for crop yield.

Tractor weight and distribution has an effect on soil compaction and an effect on what equipment and tools a particular tractor can carry or pull through a field. Weight is both a blessing and a curse. Weight improves traction which is of added importance in dealing with a wet or soggy field by providing earlier access. On the other hand, weight increases soil compaction. Distribution of weight is important to avoid lifting the front of a tractor off the ground and avoiding unnecessary compaction. This especially is a problem with wheel tractors where if the front wheels leave the ground, the tractor cannot be steered.

Distribution of weight will also change during a day's spraying as a spray tank empties. Efforts to deal with weight distribution such as placing spray reservoirs forward of the back wheels is a trade off. Such placement reduces visibility and can also interfere with repair and maintenance of the engine. Use of additional wheels known as duals to reduce compaction and increase traction is also a trade off, as maintenance is made more difficult and an uneven field can lead to broken axles.

Visibility is important. If a tractor veers from a furrow damage to the crop occurs. Similarly, the better a driver may observe a field as he moves through, the more likely problems can be detected early and better handled.

The wheel base of wheel tractors can usually be varied to some degree, but to make the change is cumbersome and time consuming. Many wheel tractors have an axle extending outward from the body of the tractor along which the wheel may be attached at various points. A drawback is that the vertical clearance is limited to ½ the size of the wheel minus ½ the diameter of the axle because the axle passes through the center of the wheel. Larger wheels increase clearance but in turn are heavier, more cumbersome and expensive.

Not all fields are level and the center of gravity and weight distribution of a tractor can limit the direction a tractor moves safely.

OBJECTS OF THE INVENTION

Accordingly, it is an object of this invention to provide a tracked tractor with good vertical clearance.

Another object is a tractor that can be easily driven forward or backwards.

Yet another object is a tractor with easily changeable track base so that the furrows through crops can be spaced to maximize yield rather than to meet tractor constraints.

It is a further object that the distribution of weight of the tractor be easily changed from time to time.

A yet further object is a tractor which can travel horizontally on the side of a hill with the tracks, engine and cab vertical.

Other objectives, advantages and novel features of the invention will become apparent to those skilled in the art upon examination of the invention and the accompanying drawings.

SUMMARY OF THE INVENTION

BRIEF DESCRIPTION OF THE FIGURES

The following detailed description, taken in conjunction with the accompanying drawings, illustrates a preferred embodiment of the invention. The drawings are:

FIG. 3 is a top view of a tractor in accordance with the invention.

DETAILED DESCRIPTION OF A PREFERRED EMBODIMENT

Figure 1:
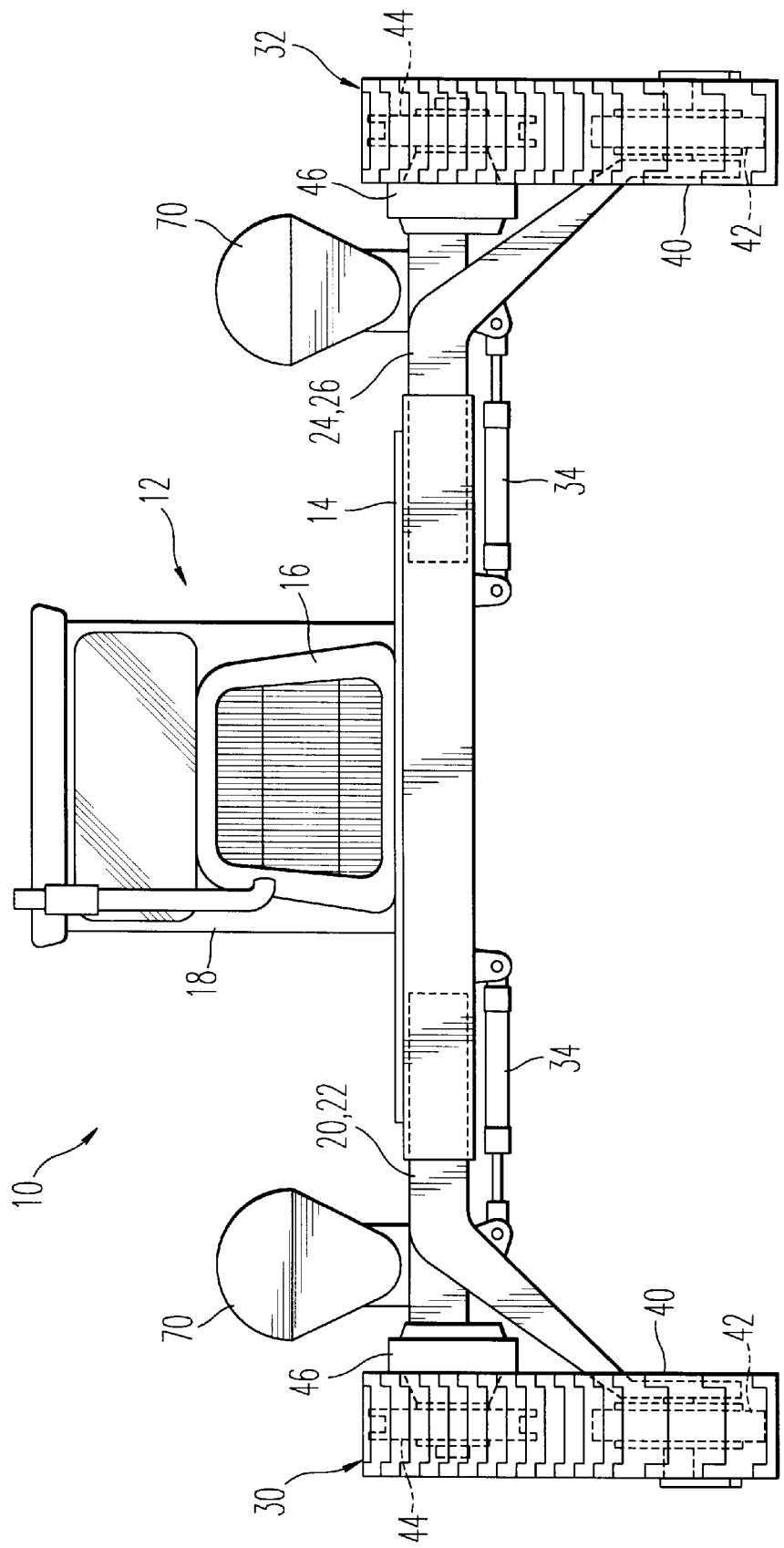
FIG. 1 is a front view of a tractor in accordance with the invention.

Shown in Figures is a tractor 10 in accordance with the invention. The tractor 10 includes a central structure 12 which includes a platform 14 to which an engine 16 is slideably mounted and to which a cab 18 is rotatably mounted. Attached to and extending outward from opposite sides of the platform are two telescoping arms 20, 22, 24, and 26 preferably extending parallel on each side. Attached to the distal end of arms 20 and 22 is track assembly 30 and at the distal end of arms 24 and 26 is track assembly 32. The attachment of the arms to the assemblies 30 and 32 is preferably as near the top of the assembly 30 and 32 and certainly above half the height of the assemblies 30 and 32.

It is to be appreciated that for side hill use, one modification is to have the attachments between track assemblies and the arms and the central structure be made tiltable. Tiltability allows the center of gravity to be shifted for better stability. If a vertical line through the center of gravity strikes the ground outside the tracks, the tractor will roll. Normally the more centered the vertical line between the tracks the more stable the tractor. The problem is increased as the central structure 12 is raised off the ground for clearance. This raises the center of gravity and the higher the center gravity, the greater the concern if the tractor is used on hills. The tilt is towards the hill when transversing sideways. This modification would have the degree of tiltability, be hydraulically controlled and preferably be adjustable from the cab and responsive periodically to the changing conditions either automatically with a horizontal sensor or manually with the cab dials having a horizontal display to suggest the changes. It is not intended that the tracks toe in or out but rather that the tracks be controllably tilted from the vertical.

The telescoping arms 20, 22, 24, and 26 each also include a means for adjusting the length of the arm. A suitable means is a hydraulic ram 34. Preferably the 4 rams 34, one to each arm act in unison to vary the distance between the track assemblies 30 and 32. When the tractor is standing, varying the track distance may be impossible, but with the tractor 10 moving, varying the distance by use of the rams 34 should not be difficult and allow multiple changes during a day if needed or desired.

A real advantage for farmers is in allowing furrows in agricultural fields to be spaced to maximize yield rather than be dictated by a set wheel base. Even when planting a single crop, different spacing may be advantageous because of different soil characteristics in different locations. Typically weeding of the furrow and sides of the row is accomplished with a tractor until the crop is damaged by the undercarriage of the tractor. Thereafter weeding is done by hand which is expensive and time consuming. By maximizing the height of the arms 20, 22, 24 and 26, mechanical weeding can be used longer and hand weeding minimized.

Transportation requirements for hauling on trailers, typically without permits, limits the outside width of tractors to 10 feet. The axles of wheel tractors are not built to telescope. With the telescoping feature of the inventive tractor 10 the width can easily reach 21 feet. With expanded width more rows can be worked on each pass through the field thus reducing the number of passes needed and the time required.

Track assemblies 30 and 32 each include a continuous track 40, rollers 42, drive sprocket 44 and orbit motor 46. The rollers 42 and drive sprocket 44 form a path along which the continuous track 40 is moved by turning of the drive sprocket 44. The drive sprocket 44 has teeth and the continuous track 40 has links. The teeth and links interact to provide the motive force. It is intended that the tractor move forward or backward with equal ease. Further use of orbit motors increases the vertical clearance under the tractor between the track assemblies by avoiding the use of axles of which clearance is limited by the height of the wheels for wheel tractors. This allows tractor access into the fields later in the season.

The parts described above are conventional and adaptable to the configuration described. Hydraulic hoses 48 and 50 connect each orbit motor 46 to the engine 16 hydraulically with one hose being the inflow to the orbit motor 46 and the other the outflow. Each orbit motor 46 responds to hydraulic pressure in the hose to convert the pressure into rotation of the drive sprocket 44. The distance for the hoses 48 and 50 to reach the orbit motors 46 will vary as the track assemblies 30 and 32 are extended out or retracted. To take up slack a curl wrap 52 is rotatably attached to the bottom of the platform 14. The curl wrap 52 winds in one direction to feed out hose when the track base is increased and wound in the opposite direction to pick up hose slack. The ease with which hydraulic hoses can be retracted or extended adds to the ease of changing tracker base to match furrow separation or for trailer loading for transportation.

Figure 2:
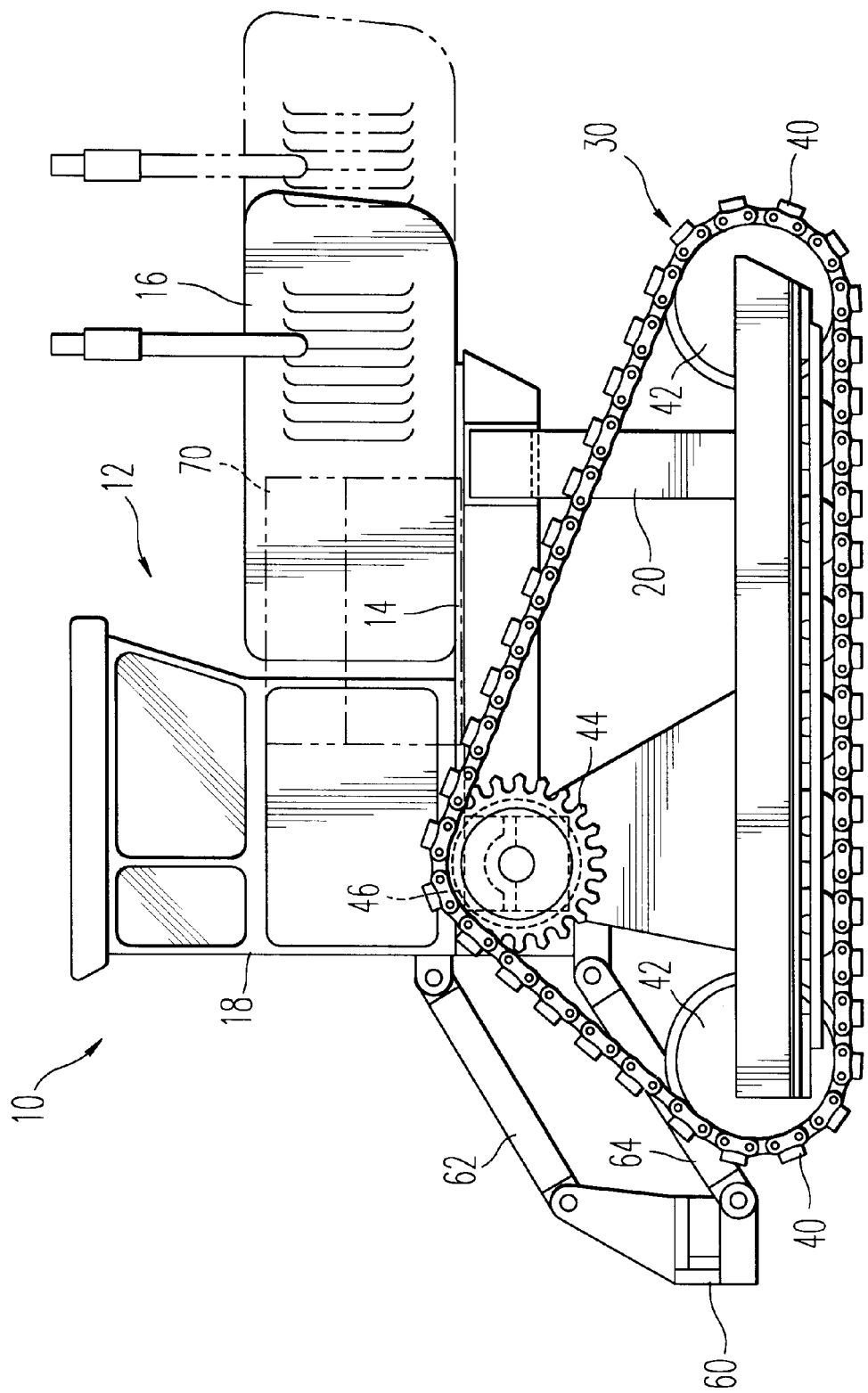
FIG. 2 is a side view of a tractor in accordance with the invention.

As seen in FIGS. 2 and 3, the tractor 10 will be equipped with a tool bar 60 attached at three points to hydraulic arms 62, 64, and 66. The first arm 62 extends outward from the center of the tractor 10 from the platform 14. The other two arms 64 and 66 each extend out from the tractor 10 near the tract assemblies 30 and 32. In practice the tool bar 60 is detachable from the arms. The arms can be hydraulically raised and lowered. Typically the bar 60 is lowered so that tools can be attached to the bar 60 and also in the field to do work. For transportation purposes the bar 60 is raised.

The center of gravity considerations are important to a tractor 10 in terms of stability and compaction. The tractor engine 16 is mounted on the platform in a slideable manner in a forward and backward direction. Engine weight is concentrated and movement backward or forward will significantly move the center of gravity. Preferably the center of gravity is kept at the midpoint between the point the tracks 40 strike the ground and the point the tracks 40 leave the ground. Similarly, the tool bar 60 is a significant weight with or without tools attached. The location of the engine 16 is intended to offset and adjust for the condition of the tool bar 60. Again with the tractor 10 pulling equipment or transporting equipment, weights may need to be offset. The location of the engine 16 can also be changed as material is sprayed to offset weight changes. Steep hills are another application in which the engine will be moved in the uphill direction to better position the center of gravity. The type of accident in which the tractor goes over backwards or head over heels is well known.

The track assemblies will preferably include equipment mounts to support tanks 70 and harvest containers. An added advantage of distancing the track assemblies from the engine is the items carried do not interfere with engine access nor prevent close in ground observation.

The cab 18 is mounted to rotate 180° to face backward or forward which is a relative term. This is to facilitate driving the tractor 10 in either direction safely. There are times when watching the operation of tools 60 is a top priority and others not.

We claim:

1. A tractor having a central structure which includes a rotatable cab and a platform on which an engine is slideably mounted and the location of which is hydraulically controlled.

2. The tractor of claim 1 to which structure is attached and extended from opposite sides are two telescoping arms on each side and attached to the distal end of arms is a track assembly, one on each side of central structure.

* * * * *